Figure 1:
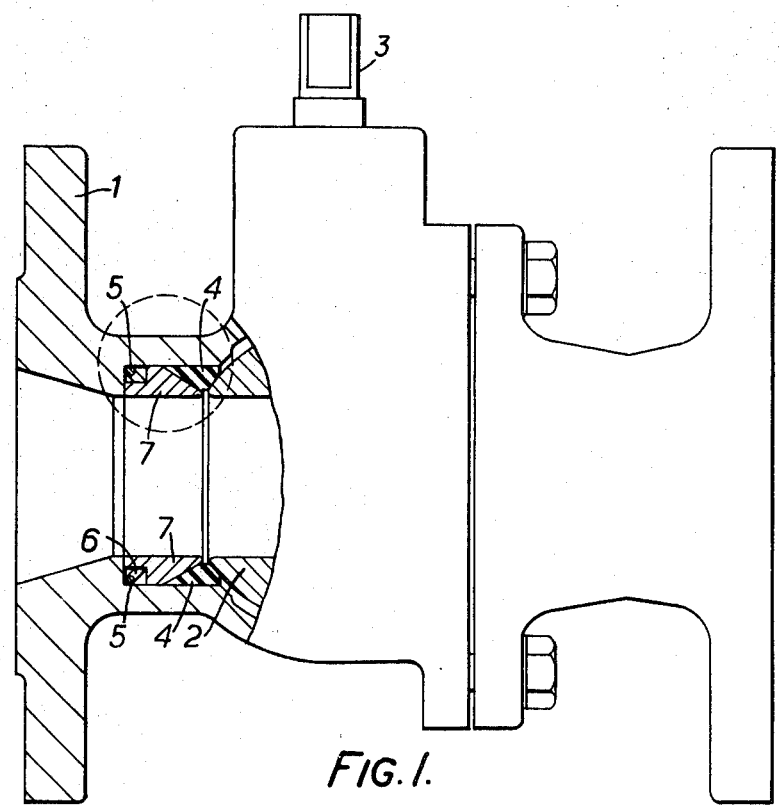

United States Patent [19]
Jones et al.

[11] 3,721,425
[45] March 20, 1973

[54] SEAT ASSEMBLY FOR BALL VALVES

[75] Inventors: Gerald Cedric Jones; Herbert Bentley Leek, both of Hereford, England

[73] Assignee: Saunders Valve Company Limited, Cwmbran, Monmouthshire, England

[22] Filed: Aug. 16, 1971

[21] Appl. No.: 171,897

[30] Foreign Application Priority Data

Aug. 26, 1970 Great Britain.....................41,011/70

[52] U.S. Cl. ...................251/174, 251/315, 251/317
[51] Int. Cl..............................................F16k 11/04
[58] Field of Search...............251/174, 315, 316, 317

[56] References Cited

UNITED STATES PATENTS 3,333,813  8/1967  Rabe ..........................251/174 X
3,387,815  6/1968  Richards ..........................251/174
3,469,818  9/1969  Cowan..........................251/174 X Primary Examiner—Harold W. Weakley
Attorney—Arthur H. Seidel et al.

[57] ABSTRACT

A ball valve of the type having a ball with a flow passage therethrough rotatably mounted in a bore in a valve casing in engagement with seating rings of extrudable material disposed on opposite sides of the ball and urged into sealing contact with the ball by spring-urged backing rings having conical surfaces confronting similar conical surfaces of the seating rings wherein at least one of the seating rings is limited in its movement in a direction towards the ball by abutment with a circlip received partially in a recess in the wall of the bore and projecting into said bore.

3 Claims, 2 Drawing Figures

SEAT ASSEMBLY FOR BALL VALVES

This invention concerns ball valves of the type wherein a seal between the rotatable ball and the valve housing is provided by a seating ring and backing ring assembly of the type described in our prior patents Nos.

When a seating ring of this type is in position within a valve its outer cylindrical surface is supported by intimate contact with the inner surface of the port in which it is located, its conical rear surface is supported by the mating surface of the backing ring which serves to urge the seating ring into contact with the ball, and its shaped ball-engaging forward face is firmly supported by the ball surface thus leaving unsupported only two relatively minor surface areas, one extending between the ball and backing ring and facing into the bore and the other extending between the ball and the port and facing outwardly into the housing portion above the ball. When such a seating ring is subjected to high pressure there is a tendency for the material of the seating ring to be extruded at one or other of its unsupported faces into either the gap between the ball and port or the gap between the ball and backing ring. Extrusion between the ball and port is particularly undesirable and it is the object of the invention to overcome this difficulty.

To this end the invention contemplates retaining the backing ring - seating ring assembly within the port by means of a retaining ring the inner edge of which engages in recess formed in the outer cylindrical surface of the seating ring and the outer edge of which engages in a recess in the wall of the port or abuts a further ring engaged in a recess in the wall of the port. In the case where the retaining ring engages in both recesses it is in the form of a circlip preferably of rectangular cross-section and in the case where it abuts a further ring such further ring is in the form of a circlip, so that the assembly may be inserted in position in the port before the retaining ring is located in position.

Figure 2:
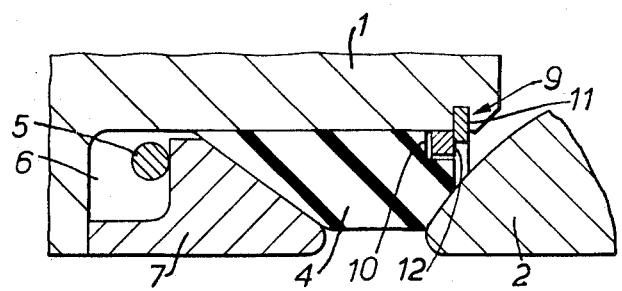

A preferred embodiment of the invention will now be described with reference to the accompanying drawings of which:

FIG. 1 is a view, partly in section, of a ball valve of the known type to which the invention can be applied and FIG. 2 is a sectional view to an enlarged scale of the portion of the valve shown outlined in a circle in FIG. 1 with the invention applied thereto.

The ball valve shown in section in FIG. 1 comprises a casing 1 in which is located a spherical plug or ball 2 which is arranged to be rotated between open and closed positions of the valve from the exterior of the casing 1 by an operating shaft 3. The casing is shown broken away to disclose the location of one of a pair of seating rings 4 disposed on opposite sides of the ball 2. The ring 4 is resiliently urged into sealing engagement with the spherical outer surface of the ball 2 by a series of coil springs 5 acting between a shoulder 6 in the casing, formed by a counterbore of larger diameter than the main bore though the casing 1, and a metal thrust ring 7 of frustoconical form which extends into the countersink of the seating ring 4.

FIG. 2 shows that portion of FIG. 1 outlined in a circle to a larger scale with the seating ring 4 and the bore in the casing modified in accordance with the invention. The modification consists in the provision of a recess 9 in the wall surface of the bore in the casing 1 and the provision of a recess 10 at the ball-engaging end of the seating ring 4. In the latter recess 10 is disposed a metal retaining ring or washer 12 and in recess 9 is disposed a circlip 11 of rectangular cross-section part of which projects into the bore for abutment with the ring or washer 12.

With the arrangement illustrated in FIG. 2 when the seating ring 4 is subjected to high pressure any tendency to extrude will occur at the inner face of the seating ring through the gap between the ball 2 and the backing ring 7 which is less objectionable than extrusion between the ball and the port.

The functions of both retaining ring 12 and circlip 9 may be performed by a single circlip engaging in both recess 9 and recess 10 in which case the two recesses are in register instead of being offset as shown in FIG. 2.

We claim:

1. A ball valve of the type having a ball with a flow passage therethrough rotatably mounted in a bore in a valve casing in engagement with seating rings of extrudable material disposed on opposite sides of the ball and urged into sealing contact with the ball by spring-urged backing rings having conical surfaces confronting similar conical surfaces of the seating rings wherein at least one of the seating rings is limited in its movement in a direction towards the ball by abutment with a circlip received partially in a recess in the wall of the bore and projecting into said bore.

2. A ball valve as claimed in claim 2 wherein the circlip extends between a recess in the wall of the bore and a recess in the outer surface of said sealing ring at the ball engaging end thereof.

3. A ball valve as claimed in claim 1 wherein said sealing ring has a recess in its outer surface at its ball-engaging end and a retaining ring is positioned in such recess to engage the projecting part of said circlip.

* * * * *